ent Office 2,839,555
Patented June 17, 1958

2,839,555
PRODUCTION OF ALKALI METAL ALUMINIUM ALKYLS

George Robert Fulton, Norton-on-Tees, England, assignor to Imperial Chemical Industries Limited, a corporation of Great Britain No Drawing. Application November 15, 1954
Serial No. 469,037

Claims priority, application Great Britain
November 18, 1953

9 Claims. (Cl. 260—448)

This invention relates to the production of metal alkyls.

It has already been proposed to prepare lithium aluminium tetra-alkyls by reacting lithium aluminium hydride with ethylene or a mono-substituted ethylene such as propylene. However, I have found that lithium aluminium hydride in a high state of purity either does not react or reacts very slowly with ethylene or a mono-substituted ethylene to form lithium aluminium tetra-alkyls at temperatures below the decomposition temperature of lithium aluminium hydride. I have further found that this and similar reactions using other complex hydrides proceed rapidly, giving good yields of a complex alkyl, when the reaction is carried out in the presence of an aluminium halide or other Friedel-Crafts type catalyst such as zinc chloride and ferric chloride.

According to the present invention, therefore, there is provided a process for the production of a complex alkyl in which a complex hydride of aluminium and of an alkali metal is reacted at elevated temperature and substantially in the absence of moisture and oxygen, with one or more olefines containing not more than 12 carbon atoms and having the general formula R.CH:CH$_2$ where R denotes hydrogen or an alkyl group, in the presence of a Friedel-Crafts type catalyst as hereinafter defined.

Throughout this specification the terms "complex alkyl" or "complex hydride" are used to denote an alkyl or hydride in which the alkyl groups or hydrogen atoms are combined with aluminium and an alkali metal.

Complex hydrides of aluminium and of either lithium or sodium are particularly suitable for use in the process of the invention. I prefer to use a complex hydride of aluminium and lithium.

The Friedel-Crafts type catalyst should not cause undesired decomposition of the complex hydride. For example, hydrogen fluoride is not a suitable catalyst in the process of the invention. Particularly suitable catalysts are aluminium halides, aluminium alkyl halides, zinc chloride and ferric chloride.

While we do not wish to be restricted by any theory of reaction mechanism we believe that the Friedel-Crafts type catalyst exerts its catalytic effect through the medium of an intermediate compound probably formed by reaction between the catalyst and the complex hydride.

If only one olefine, as hereinbefore defined, is used in the process of the invention, a complex alkyl is produced in which the alkyl groups are identical while if two or more olefines, as hereinbefore defined, are used, the complex alkyl may contain different alkyl groups.

In carrying out the process of the invention the reactants should be substantially free from moisture and moisture and air should be excluded from the apparatus in order to avoid undesired decomposition of the complex hydride or alkyl. It is also desirable to use an excess of olefine over the quantity theoretically required to react with the complex hydride to ensure that the complex hydride reacts completely and thereby facilitate the isolation of the complex alkyl in a substantially pure form.

The temperature at which the reaction is carried out should preferably not be less than about 50° C. to ensure a reasonably rapid rate of reaction and it should not exceed the temperature at which the complex hydride decomposes or at which loss of olefine from the complex alkyl occurs under the conditions of the reaction. For example, lithium aluminium tetrapropyl is stable up to 250° C. at atmospheric pressure while in the presence of propylene it is stable up to at least 300° C. Lithium aluminium tetraoctyl is stable up to at least 250° C. at atmospheric pressure. It is preferred to carry out the reaction within the temperature range 50° to 300° C.

If the olefine is liquid at the reaction temperature the reaction may be carried out at atmospheric pressure. If the olefine is gaseous at the reaction temperature the reaction should be carried out at elevated pressure and we have found that a suitable pressure is that autogeneously developed by the olefine at the temperature employed. Higher pressures may however be used.

Preferably, the reaction is carried out in the presence of an inert solvent, such as paraffinic and alicyclic hydrocarbons. Examples of suitable solvents are n-octane, decalin and cyclohexane.

The quantity of Friedel-Crafts type catalyst used may vary within wide limits but should not be less than 0.1 percent by weight of the complex hydride used. I prefer to use about 5 percent to about 20 percent by weight of the complex hydride.

Example 1

2 grams lithium aluminium hydride, 0.1 gram aluminium chloride and 200 grams propylene were introduced into a 1 litre autoclave and heated at 120° C. for 3 hours. The reactants and apparatus were substantially free from moisture and air was excluded from the apparatus. After cooling the reaction product and removing excess propylene 10.4 grams of substantially pure lithium aluminium tetrapropyl were obtained as colourless needle crystals. The yield on the basis of the lithium aluminium hydride was 96% of the theoretical yield.

Example 2

10 grams lithium aluminium hydride, 0.5 gram aluminium chloride, about 100 grams propylene and 100 ml. cyclohexane were introduced into a 1 litre glass-lined autoclave and heated at 120° C. for 3 hours. After cooling, the cyclohexane was removed from the reaction product by vacuum distillation at a temperature not exceeding 50° C. The yield of lithium aluminium tetrapropyl on the basis of the lithium aluminium hydride was 64% of the theoretical yield.

Example 3

2 grams lithium aluminium hydride were heated with excess ethylene in a glass-lined autoclave at 120° for 3 hours. No lithium aluminium tetraethyl was obtained. The same result was obtained when the experiment was repeated in the presence of 20 ml. decalin as a solvent.

Example 4

The following experiments were designed to show the effect of the catalyst and solvent on the reaction between lithium aluminium hydride and ethylene.

In all the experiments the same quantities of the reactants and the same reaction conditions were used. Thus 2 grams lithium aluminium hydride and 0.02 gram catalyst were heated with excess ethylene in a glass-lined autoclave at 120° C. for 3 hours. In certain of the experiments the reaction was carried out in the presence of a solvent i. e. 20 ml. decalin. The results obtained are shown below. The lithium aluminium tetraethyl was isolated as described in Example 1 (no solvent) and Example 2 (solvent).

| Catalyst | Solvent | Yield of lithium aluminium tetraethyl, percent |
| --- | --- | --- |
| AlCl₃ | None | 78 |
| AlCl₃ | Decalin | 99 |
| ZnCl₂ | None | 67 |
| ZnCl₂ | Decalin | 100 |
| FeCl₃ | None | 80 |
| FeCl₃ | Decalin | 99 |

The yields of lithium aluminium tetraethyl were expressed as a percentage of the theoretical yield based on lithium aluminum hydride.

*Example 5*

5 grams lithium aluminium hydride, 0.9 gram aluminium chloride and 62.5 grams octene-1 were heated in a flask under reflux conditions for 3 hours. The reactants and apparatus were substantially free from moisture and an atmosphere of nitrogen was maintained in the apparatus. Unreacted octene-1 was separated from the reaction product by vacuum distillation and 51 grams of lithium aluminium tetraoctyl obtained as colourless needle crystals. The yield on the basis of the lithium aluminium hydride was 80% of the theoretical yield.

I claim:

1. A process for the production of an alkali metal aluminium alkyl which comprises reacting an alkali metal aluminium hydride substantially in the absence of moisture and oxygen, with at least one olefine containing less than 13 carbon atoms and having the general formula $R.CH:CH_2$ in which R is a monovalent radical selected from the group consisting of hydrogen and alkyl radicals, in the presence of a Friedel-Crafts type catalyst selected from the group consisting of aluminium halides, zinc chloride and ferric chloride, said reaction being carried out at an elevated temperature which is not less than 50° C., and not in excess of the temperature at which said hydride decomposes and loss of olefine from said alkyl occurs.

2. A process for the production of an alkali metal aluminium alkyl which comprises reacting an alkali metal aluminium hydride substantially in the absence of moisture and oxygen, with at least one olefine containing less than 13 carbon atoms and having the general formula $R.CH:CH_2$ in which R is a monovalent radical selected from the group consisting of hydrogen and alkyl radicals, in the presence of a Friedel-Crafts type catalyst selected from the group consisting of aluminium halides, zinc chloride and ferric chloride and in an amount which is equal to about 5 percent by weight of the hydride, said reaction being carried out at an elevated temperature which is not less than 50° C., and not in excess of the temperature at which said hydride decomposes and loss of olefine from said alkyl occurs.

3. A process for the production of an alkali metal aluminium alkyl which comprises reacting an alkali metal aluminium hydride substantially in the absence of moisture and oxygen, and in the presence of an inert solvent, with at least one olefine containing less than 13 carbon atoms and having the general formula $R.CH:CH_2$ in which R is a monovalent radical selected from the group consisting of hydrogen and alkyl radicals, in the presence of a Friedel-Crafts type catalyst selected from the group consisting of aluminium halides, zinc chloride and ferric chloride, said reaction being carried out at an elevated temperature which is not less than 50° C., and not in excess of the temperature at which said hydride decomposes and loss of olefine from said alkyl occurs.

4. A process for the production of an alkali metal aluminium alkyl which comprises reacting an alkali metal aluminium hydride substantially in the absence of moisture and oxygen, and in the presence of an inert solvent, with at least one olefine containing less than 13 carbon atoms and having the general formula $R.CH:CH_2$ in which R is a monovalent radical selected from the group consisting of hydrogen and alkyl radicals, in the presence of a Friedel-Crafts type catalyst selected from the group consisting of aluminium halides, zinc chloride and ferric chloride and in an amount which is equal to about 5 percent by weight of the hydride, said reaction being carried out at an elevated temperature which is not less than 50° C., and not in excess of the temperature at which said hydride decomposes and loss of olefine from said alkyl occurs.

5. A process for the production of an alkali metal aluminium alkyl which comprises reacting an alkali metal aluminium hydride at a temperature within the range 50° C. to 300° C., in the absence of moisture and oxygen, with at least one olefine containing less than 13 carbon atoms and having the general formula $R.CH:CH_2$ in which R is a monovalent radical selected from the group consisting of hydrogen and alkyl radicals, in the presence of a Friedel-Crafts type catalyst selected from the group consisting of aluminium halides, zinc chloride and ferric chloride.

6. A process for the production of an alkali metal aluminium alkyl which comprises reacting an alkali metal aluminium hydride at a temperature within the range 50° C. to 300° C. and substantially in the absence of moisture and oxygen, with at least one olefine containing less than 13 carbon atoms and having the general formula $R.CH:CH_2$ in which R is a monovalent radical selected from the group consisting of hydrogen and alkyl radicals, in the presence of a Friedel-Crafts type catalyst selected from the group consisting of aluminium halides, zinc chloride and ferric chloride and in an amount which is equal to about 5 percent by weight of the hydride.

7. A process for the production of an alkali metal aluminium alkyl which comprises reacting an alkali metal aluminium hydride at a temperature within the range 50° C. to 300° C., substantially in the absence of moisture and oxygen, and in the presence of an inert solvent, with at least one olefine containing less than 13 carbon atoms and having the general formula $R.CH:CH_2$ in which R is a monovalent radical selected from the group consisting of hydrogen and alkyl radicals, in the presence of a Friedel-Crafts type catalyst selected from the group consisting of aluminium halides, zinc chloride and ferric chloride and in an amount which is equal to about 5 percent by weight of the hydride.

8. A process for the production of an alkali metal aluminium alkyl which comprises reacting an alkali metal aluminium hydride at elevated pressure and substantially in the absence of moisture and oxygen, with at least one olefine containing less than 13 carbon atoms and having the general formula $R.CH:CH_2$ in which R is a monovalent radical selected from the group consisting of hydrogen and alkyl radicals, in the presence of a Friedel-Crafts type catalyst selected from the group consisting of aluminium halides, zinc chloride and ferric chloride, said reaction being carried out at an elevated temperature which is not less than 50° C., and not in excess of the temperature at which said hydride decomposes and loss of olefine from said alkyl occurs.

9. A process for the production of an alkali metal aluminium alkyl which comprises reacting an alkali metal aluminium hydride substantially in the absence of moisture and oxygen, with at least one olefine containing less than 13 carbon atoms and having the general formula $R.CH:CH_2$ in which R is a monovalent radical selected from the group consisting of hydrogen and alkyl radicals and in an amount which is more than the amount theoretically required to react with the hydride, in the presence of a Friedel-Crafts type catalyst selected from the group consisting of aluminium halides, zinc chloride and ferric chloride, said reaction being carried out at an elevated temperature which is not less than 50° C., and not in excess of the temperature at which said hydride decomposes and loss of olefine from said alkyl occurs.

References Cited in the file of this patent
FOREIGN PATENTS 917,006    Germany _____ Aug. 23, 1954

OTHER REFERENCES

Ziegler: Angenwandte Chemie, pages 323–329, June 21, 1952.